US008706920B2

(12) United States Patent
Fleizach et al.

(10) Patent No.: US 8,706,920 B2
(45) Date of Patent: *Apr. 22, 2014

(54) ACCESSORY PROTOCOL FOR TOUCH SCREEN DEVICE ACCESSIBILITY

(71) Applicant: Apple Inc., Cupertino, CA (US)

(72) Inventors: Christopher B. Fleizach, Santa Clara, CA (US); Paul Holden, San Francisco, CA (US); Eric Taylor Seymour, San Jose, CA (US); Emily Clark Schubert, San Jose, CA (US); Lawrence G. Bolton, Mahomet, IL (US); Sylvain Rene Yves Louboutin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,331

(22) Filed: Apr. 25, 2013

(65) Prior Publication Data

US 2013/0229377 A1      Sep. 5, 2013

Related U.S. Application Data

(63) Continuation of application No. 12/714,306, filed on Feb. 26, 2010, now Pat. No. 8,433,828.

(51) Int. Cl.
*G06F 3/00*      (2006.01)
*H04B 1/38*      (2006.01)

(52) U.S. Cl.
USPC ............................... 710/8; 455/557; 715/700

(58) Field of Classification Search
USPC ........... 710/8–14, 72; 455/557; 719/321, 328; 715/700
See application file for complete search history.

(56) References Cited

U.S. PATENT DOCUMENTS

| 5,933,614 | A  | 8/1999  | Tavallaei et al. |
| 6,097,391 | A  | 8/2000  | Wilcox |
| 6,116,907 | A  | 9/2000  | Baker et al. |
| 6,144,377 | A  | 11/2000 | Oppermann et al. |
| 6,377,928 | B1 | 4/2002  | Saxena et al. |
| 6,442,523 | B1 | 8/2002  | Siegel |
| 6,448,986 | B1 | 9/2002  | Smith |
| 6,529,744 | B1 | 3/2003  | Birkler et al. |
| 6,564,186 | B1 | 5/2003  | Kiraly et al. |
| 6,591,379 | B1 | 7/2003  | LeVine et al. |
| 6,615,176 | B2 | 9/2003  | Lewis et al. |

(Continued)

OTHER PUBLICATIONS

U.S. Appl. No. 11/643,389, filed Dec. 20, 2006, entitled "Spoken Interfaces".

(Continued)

*Primary Examiner* — Christopher Shin
(74) *Attorney, Agent, or Firm* — Blakely, Sokoloff, Taylor & Zafman LLP

(57) ABSTRACT

Techniques for controlling a touch input device using an accessory communicatively coupled to the device are disclosed. In one aspect, an accessibility framework is launched on the device. An accessory coupled to the device is detected. Receipt of input from the accessory is enabled. An accessibility packet is received from the accessory. The accessibility packet includes an accessibility command and one or more parameters. The accessibility packet is processed to extract the first accessibility command and the one or more parameters. Input is generated for the accessibility framework based on the accessibility command and the one or more parameters. In some implementations, the device also sends accessibility commands to the accessory, either in response to accessibility commands received from the accessory or independent of any received accessibility commands.

23 Claims, 8 Drawing Sheets

(56) References Cited

U.S. PATENT DOCUMENTS

| | | | |
|---|---|---|---|
| 6,728,675 B1 | 4/2004 | Maddalozzo et al. |
| 6,832,381 B1 | 12/2004 | Mathur et al. |
| 6,948,094 B2 | 9/2005 | Schultz et al. |
| 7,051,096 B1 | 5/2006 | Krawiec et al. |
| 7,137,126 B1 | 11/2006 | Coffman et al. |
| 7,216,298 B1 | 5/2007 | Ballard et al. |
| 7,644,367 B2 | 1/2010 | McKeon et al. |
| 8,001,483 B2 | 8/2011 | De Souza et al. |
| 8,144,122 B2 | 3/2012 | Chen et al. |
| 2001/0002126 A1 | 5/2001 | Rosenberg et al. |
| 2001/0020259 A1 | 9/2001 | Sekiguchi et al. |
| 2002/0122053 A1 | 9/2002 | Dutta et al. |
| 2002/0138616 A1 | 9/2002 | Basson et al. |
| 2002/0152255 A1 | 10/2002 | Smith, Jr. et al. |
| 2003/0061317 A1 | 3/2003 | Brown et al. |
| 2003/0090474 A1 | 5/2003 | Schaefer |
| 2003/0164848 A1 | 9/2003 | Dutta et al. |
| 2003/0210266 A1 | 11/2003 | Cragun et al. |
| 2003/0214519 A1 | 11/2003 | Smith et al. |
| 2004/0056899 A1 | 3/2004 | Sinclair, II et al. |
| 2004/0064593 A1 | 4/2004 | Sinclair et al. |
| 2004/0070612 A1 | 4/2004 | Sinclair et al. |
| 2004/0186713 A1 | 9/2004 | Gomas et al. |
| 2005/0071165 A1 | 3/2005 | Hofstader et al. |
| 2005/0144070 A1 | 6/2005 | Cheshire |
| 2007/0262964 A1 | 11/2007 | Zotov et al. |
| 2008/0089587 A1 | 4/2008 | Kim et al. |
| 2009/0102805 A1 | 4/2009 | Meijer et al. |
| 2009/0128517 A1 | 5/2009 | Han et al. |
| 2009/0189373 A1 | 7/2009 | Schramm et al. |
| 2010/0075604 A1 | 3/2010 | Lydon et al. |
| 2010/0235552 A1 | 9/2010 | Holden et al. |
| 2010/0238111 A1 | 9/2010 | Chen et al. |
| 2010/0285839 A1 | 11/2010 | Jeong et al. |
| 2011/0087990 A1 | 4/2011 | Ng et al. |
| 2011/0199295 A1 | 8/2011 | Chen et al. |

OTHER PUBLICATIONS

U.S. Appl. No. 11/643,257, filed Dec. 20, 2006, entitled "Spoken Interfaces".
U.S. Appl. No. 10/956,720, filed Oct. , 2004, entitled "Spoken Interfaces".

ACCESSORY PROTOCOL FOR TOUCH
SCREEN DEVICE ACCESSIBILITY

This application is a continuation of co-pending U.S. application Ser. No. 12/714,306, filed on Feb. 26, 2010.

TECHNICAL FIELD

This subject matter is generally related to user control of devices.

BACKGROUND

Touch screen devices are increasing in popularity. A user generally provides input to a touch screen device using touch input (e.g., touching and/or gesturing at appropriate places on the touch screen). For a user to interact with a touch screen device using touch input, the user must generally be physically present at the device in order to touch the screen. The user must also be capable of providing touch input and capable of viewing the screen of the device or otherwise knowing where input is needed.

SUMMARY

Techniques and systems supporting the control of a touch input device, e.g., a touch screen device, from an accessory communicatively coupled to the device are disclosed. These techniques can be used to provide a protocol that a non-touch input accessory can use to interact with a device with a touch-based use interface.

In one aspect, an accessibility framework is launched on the touch input device. An accessory coupled to the device is detected. Receipt of input from the accessory is enabled. An accessibility packet is received from the Accessory. The accessibility packet includes an accessibility command and one or more parameters. The accessibility packet is processed to extract the accessibility command and the one or more parameters. Input is generated for the accessibility framework based on the accessibility command and the one or more parameters.

In another aspect, output is received from an accessibility framework. The output includes an accessibility command and a parameter. An accessibility packet is generated in response to the output and sent to the accessory. The accessibility packet identifies the accessibility command and the parameter.

Particular embodiments of the subject matter described in this specification can be implemented to realize one or more of the following advantages. Users who are not physically present at a touch screen or other touch input device can interact with the device. Users that are unable to provide touch input and/or are unable to view the screen of a touch screen or other touch input device can interact with the device. Users with any type of disability can interact with a touch screen or other touch input device, provided that the users have an accessory that they can control. Interactions between the touch input device and non-touch screen accessories can be standardized so that many different accessories can interact with all of the applications executing on a device. Interactions between the touch input device and non-touch screen accessories can be standardized so that users can interact with touch screen devices regardless of the dimension of the screen of the device. Interactions between a user and various application user interfaces can be standardized so that a user can use common commands for all user interfaces.

DESCRIPTION OF DRAWINGS

Like reference numbers and designations in the various drawings indicate like elements.

DETAILED DESCRIPTION

Example Device and Access

Figure 1:
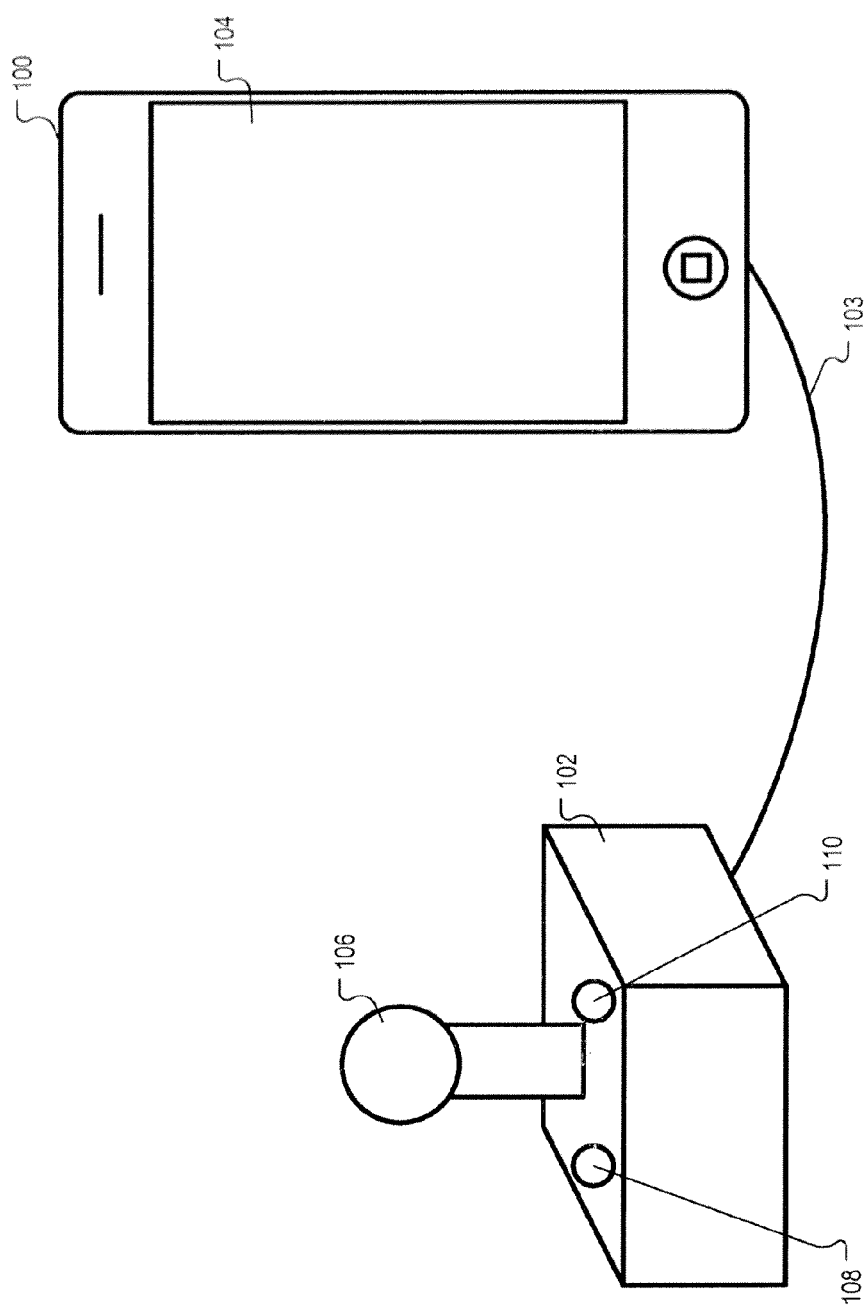
FIG. 1 illustrates an example device communicatively coupled to an accessory.

FIG. 1 illustrates example device 100 communicatively coupled to accessory 102. For example, device 100 can be coupled to accessory 102 through a wired or wireless connection, e.g., communication link 103.

Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, an automated teller machine (ATM), other commercial touch screen devices, or a combination of any two or more of these data processing devices or other data processing devices.

Device 100 can have touch sensitive display 104. Touch sensitive display 104 can implement liquid crystal display (LCD) technology, light emitting polymer display (LPD) technology, or some other display technology. Touch sensitive display 104 can be sensitive to haptic and/or tactile contact with a user. In some implementations, touch-sensitive display 104 is also sensitive to inputs received in proximity to, but not actually touching, display 104. In addition to touch sensitive display 104, or instead of touch sensitive display 104, device 100 can include other touch-sensitive surfaces (e.g., a trackpad or touchpad).

In some implementations, touch-sensitive display 104 can include a multi-touch-sensitive display. A multi-touch-sensitive display can, for example, process multiple simultaneous points of input, including processing data related to the size, shape, pressure, orientation, and/or position of each point of input. Such processing facilitates gestures and interactions with multiple fingers, chording, and other interactions. Other touch-sensitive display technologies can also be used, e.g., a display in which contact is made using a stylus or other pointing device.

A user can interact device 100 using various touch inputs. Gesture inputs can also be derived from multiple touch inputs, e.g., where a user moves his or her finger (or other input tool) across touch sensitive display 104. A user can also interact with device 100 using accessory 102. Accessory 102 can receive input from a user through a non-touch input interface. In some implementations, accessory 102 can also provide output to a user, for example, through a speaker, display screen, or haptic feedback system. For illustrative purposes, accessory 102 is shown as a joystick. However, various accessories can alternatively or additionally be used. Example accessories include, but are not limited to, joysticks, steering wheels, push buttons, remote controls, foot pedals, alternative keyboards, head pointing devices, a refreshable Braille displays, haptic mice, switch devices for users with limited motor capability (e.g., a straw into which a user blows into a straw or a button that a user presses, combined with scanner software that scans through command options and maps a specific input from the user to one of the commands). Other accessories can also be used.

A user interacts with accessory 102, for example, by providing accessory-specific inputs to the accessory. An accessory-specific input is an input recognized by the accessory. For example, a user can provide accessory-specific inputs to accessory 102 by moving stick 106 and/or pressing buttons 108 and 110. Accessory 102 can receive the accessory-specific input, map the accessory-specific input to an input to device 100, and send an accessibility packet identifying the input to device 100. For example, accessory 102 can maintain a database of information mapping accessory-specific inputs to inputs to device 100 and can retrieve the appropriate input from the database. Accessory 102 can then generate an accessibility packet according to an API specified by device 100. The accessibility packet identities the command and any parameters to the command. Accessory 102 can then send the accessibility packet to device 100, for example, through communication link 103.

In response, device 100 processes the received accessibility packet and instructs application(s) executing on the device to take appropriate action. When the appropriate action is to provide requested data to the accessory, device 100 can for at the data according to the API and send a command to present the data to accessory 102. Accessory 102 can then present the requested data to the user.

Example Process far Enabling Input from an Accessory

Figure 2:
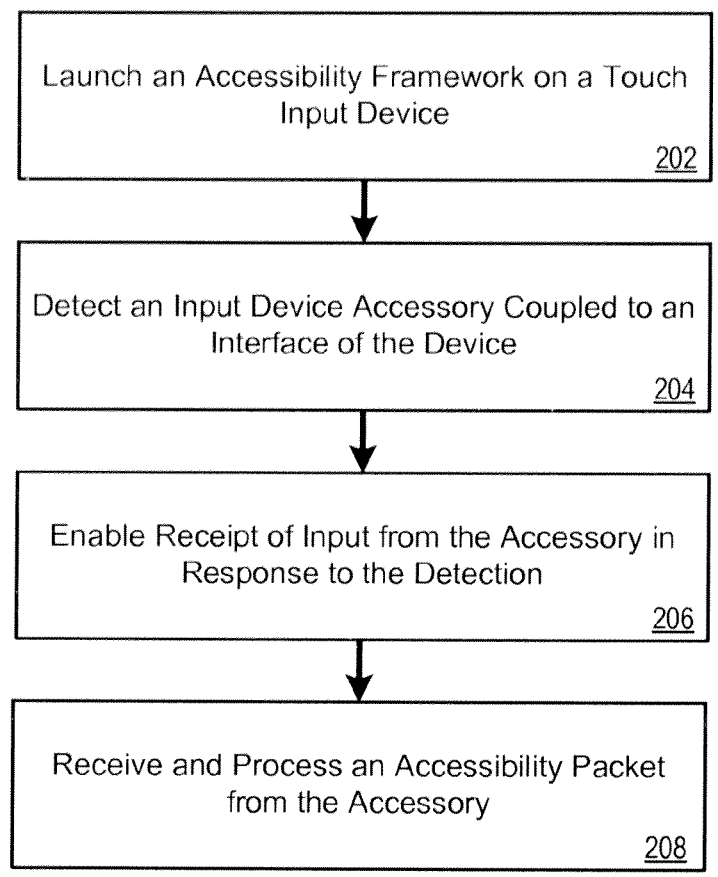
FIG. 2 is a flow diagram of an example process for enabling receipt of input from an accessory.

FIG. 2 is a flow diagram of example process 200 for enabling receipt of input from an accessory. For convenience, example process 200 will be described in reference to a device that performs process 200. The device can be, for example, a touch input device such as touch screen device 100.

The device can launch an accessibility framework (202). An accessibility framework is an application that provides various accessibility features to a user. The accessibility framework can be configured to provide one or more users of the device with enhanced access to the device. In some implementations, the accessibility framework is configured to provide users with disabilities, e.g., that cause the users to be unable to provide touch input to the device and/or unable to vie the screen of the device, with enhanced access to the device. For example, an accessibility framework can provide screen reading functionality, can support Braille output, and can otherwise provide users with information about content that is displayed on a screen of a display. An example accessibility framework is VoiceOver, available from Apple, Inc. of Cupertino, Calif.

The accessibility framework can be configured to receive touch input from a surface of a touch device and interact with one re applications executing the device in response to the touch input. The accessibility framework can be further configured to receive non-touch input through one or more accessories coupled to the touch screen device and interact with the one or more applications executing on the device in response to the input. The interactions between the accessibility framework and the applications can be the same regardless of whether touch input through the device surface or non-touch input from the accessory is received, e.g., the applications executing on the device can be unaware of whether the interactions are in response to touch input or non-touch input.

In some implementations, the accessibility framework is configured to receive touch input in a first state and to receive input from accessories in a second state. In these implementations, the accessibility framework can be switched into the appropriate state, when needed.

The device can detect an accessory coupled to an interface of the device (204). The accessory can be physically coupled to the device or otherwise communicatively coupled to the device, e.g., through a wireless connection. The device can detect that the accessory is coupled to the interface, for example, when the device receives data from the accessory.

The device can enable receipt of input from the accessory in response to the detection (206). In some implementations, the device can also disable receipt of input from a touch screen interface of the device.

In some implementations, the device is in a first state before the accessory is detected. In the first state, an operating system executing on the device is configured to receive input from the touch interface and generate input for the accessibility framework. In these implementations, the device can switch to a second state upon detection the accessory. In this second state, the device enables input from the accessory.

The device can receive and process an accessibility packet from the accessory (208). An example process for processing an accessibility packet is described in more detail below with reference to FIG. 3.

Example Process for Processing Input Received from an Accessory

Figure 3:
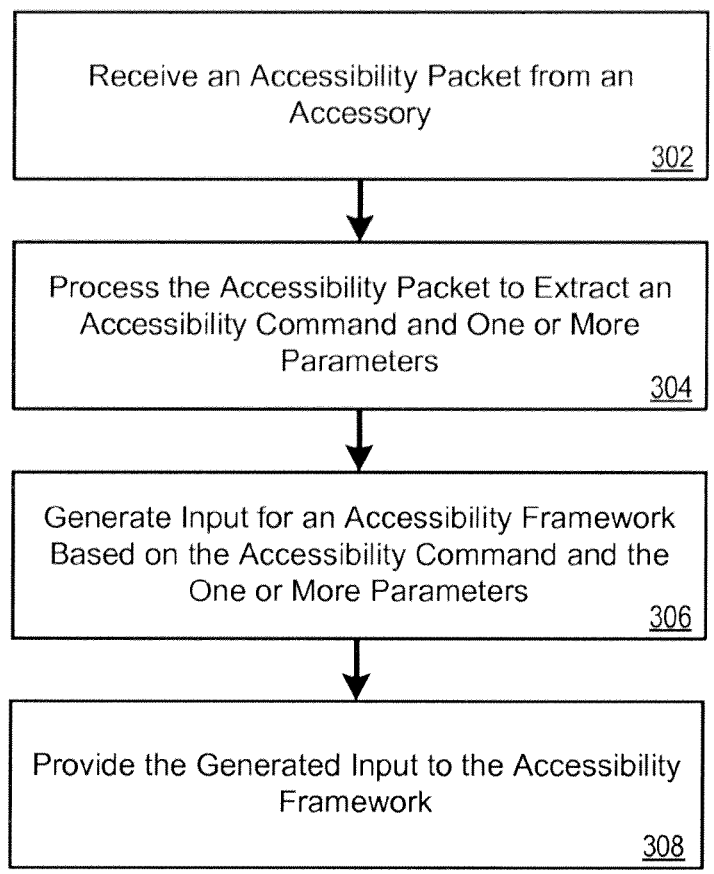
FIG. 3 is a flow diagram of an example process for processing input received from an accessory.

FIG. 3 is a flow diagram of example process 300 for interpreting input received from an accessory. For convenience, example process 300 ill be described in reference to a device that performs process 300. The device can be, for example, touch screen device 100.

The device can receive an accessibility packet from an accessory (302). The accessibility packet can include data identifying an accessibility command and one or more command-specific parameters. Example accessibility commands include accessibility event commands that request that an accessibility framework perform a particular action, get accessibility parameter commands that request a value of a particular accessibility parameter, set accessibility parameter commands that request that an accessibility parameter be set to a particular value, and get current item property commands that request a value of a particular property of a currently selected item displayed on a touch screen user interface of the device.

The accessibility packet can include a variable number of bytes; the total number depends on the number and format of parameters included in the packet. The bytes in the packet can be ordered according to an order specified by an accessory API. In general, an accessory API can specify the structure of the packet (e.g., the number and order of the bytes) for each type of command, as well as the identifier values corresponding to each command and parameters for each command. An example accessory API is described in more detail below with reference to FIG. 6. One or more bytes in the accessibility packet can correspond to the accessibility command, and one or more other bytes in the accessibility packet can correspond to the one or more parameters for the accessibility command.

The value of each of the bytes can be selected by the accessory according to the accessory API.

The device can process the accessibility packet to extract the accessibility command and one or more parameters (304). The device can extract the accessibility command and one or more parameters according to the order of bytes and identifier values for commands and parameters specified in the accessory API.

The device can generate input for an accessibility framework based on the accessibility command and the one or more parameters (306). This input can be generated according to an API used by the accessibility framework. The device can provide the generated input to the accessibility framework (308), for example, through the API.

Example Process for Generating and Sending Output to an Accessory

Figure 4:
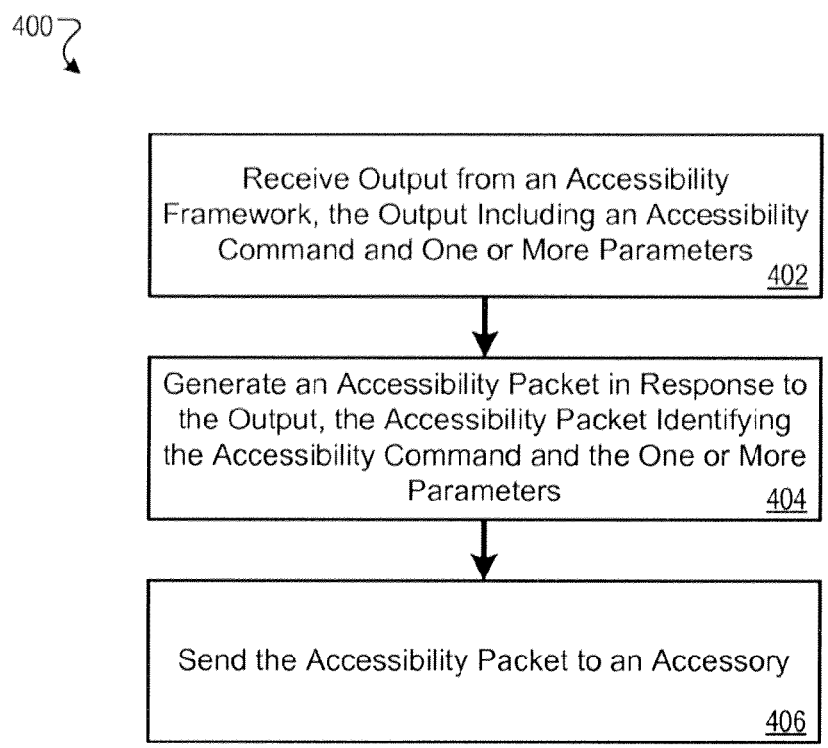
FIG. 4 is a flow diagram of an example process for generating an accessibility packet and sending the accessibility packet to an accessory.

FIG. 4 is a flow diagram of example process 400 for generating an accessibility packet and sending the accessibility packet to an accessory. For convenience, example process 400 will be described in reference to a device that performs process 400. The device can be, for example, touch screen device 100.

The device can receive output from an accessibility framework (402). The output can include an accessibility command and one or more command-specific parameters. Example accessibility commands include return accessibility parameter commands that return the value of a requested accessibility parameter to an accessory and return current item property commands that return the value of a requested item property to an accessory.

The device can generate an accessibility packet in response to the output (404). The accessibility packet can identify the accessibility command and the one or more parameters received from the accessibility framework. The device can generate the accessibility packet according to a structure specified in an accessory API. Example accessibility commands and their corresponding parameters are described in more detail below, with reference to FIG. 6.

The device can send the accessibility packet to an accessory (406), for example, through a communication link between the device and the accessory.

Figure 5:
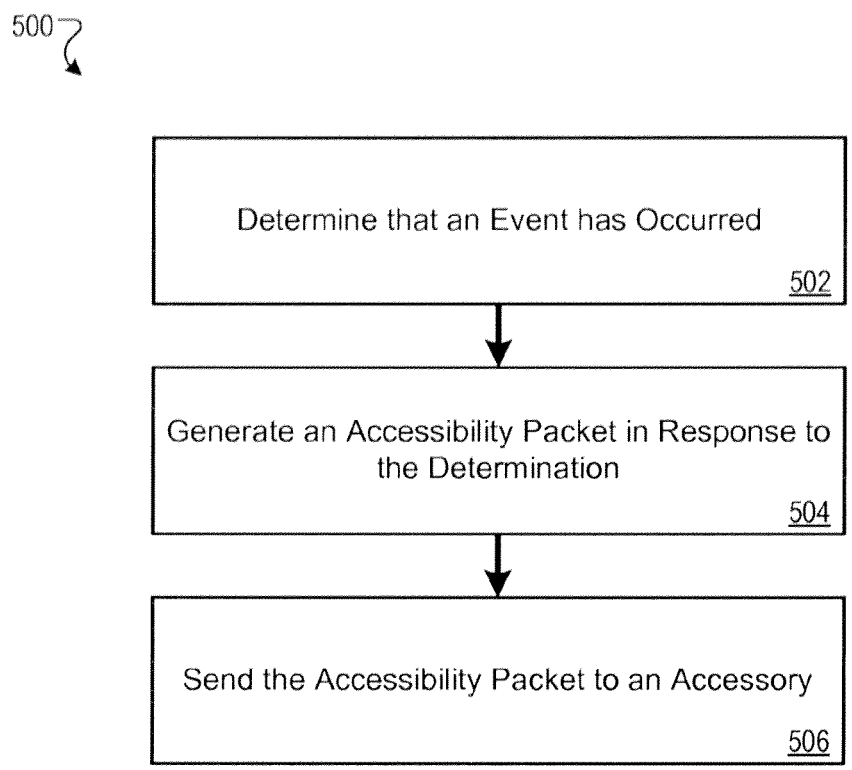
FIG. 5 is a flow diagram of an example process for detecting asynchronous events, generating an accessibility packet in response to detecting the event, and sending the accessibility packet to an accessory.

Example Process for Detecting Asynchronous Events and Sending Output to an Accessory FIG. 5 is a flow diagram of example process 500 for detecting asynchronous events, generating an accessibility packet in response to detecting the event, and sending the accessibility packet to an accessory. For convenience, example process 500 will be described in reference to a device that performs process 500. The device can be, for example, touch screen device 100.

The device can determine that an event has occurred (502). The event can be asynchronous, e.g., it can be independent of any action taken by a user, specifically any input received from an accessory coupled to the device. Example events include, for example, an incoming phone call, an incoming message (e.g., a text message, e-mail message, or chat messages), an incoming event resulting from other interactions with other users, for example, through collaborative work applications or online gaming applications, and a change in focus due to an application error message or an application warning message, and device alarms (e.g., alarm clocks, calendar reminders), and other notifications from other applications.

The device can generate an accessibility packet in response to the determination (504). The accessibility packet can identify the event and can also include one or more parameters describing the event. For example, if the event is an incoming phone call, the accessibility packet can identify that a phone call was received and the number from which the phone call was received. Similarly, if the event is an incoming message, the accessibility packet can identify that the message was received and the text of the message. As another example, if the event is a change in focus, the accessibility packet can identify that the focus of the application was changed and provide the coordinates of the new window of focus. The device can genera the accessibility packet according to a structure specified in an accessory API. For example, the device can generate an accessibility packet corresponding to an accessibility event command, or can generate a different type of packet specific to reporting of events.

The device can send the accessibility packet to an accessory (506), for example, through a communication link between the device and the accessory.

Example Software Architecture

Figure 6:
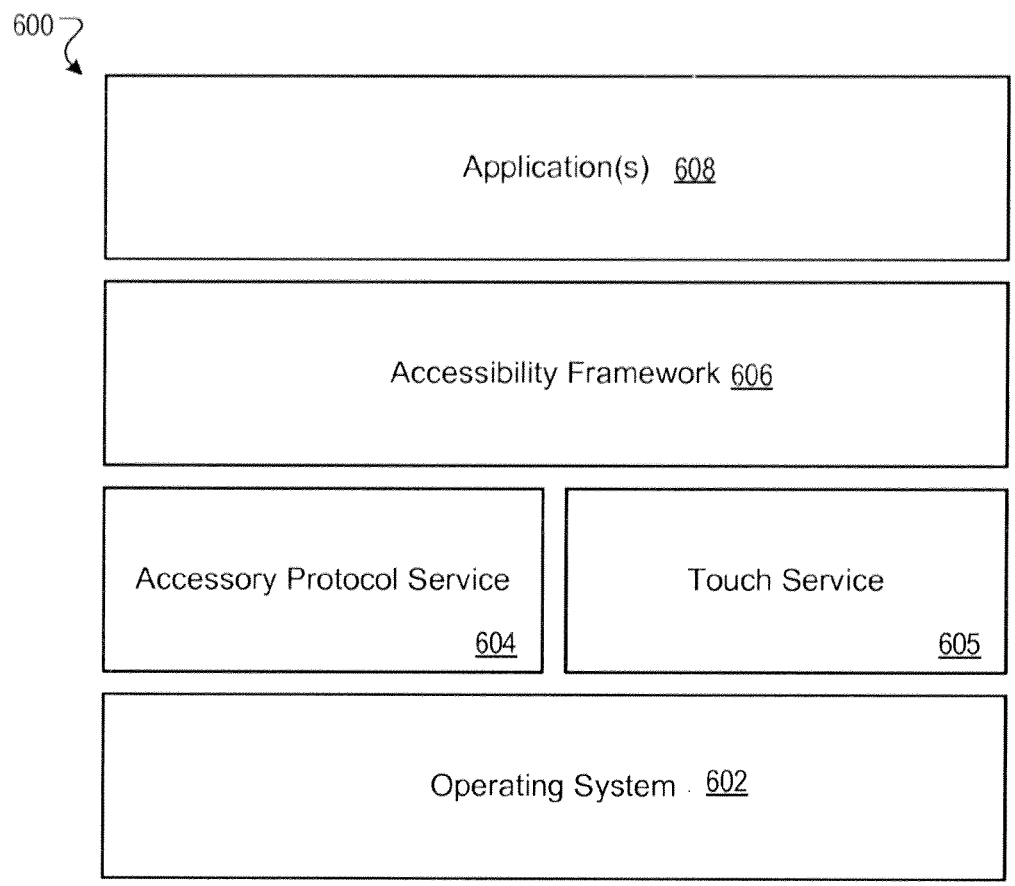
FIG. 6 illustrates an example software architecture for processing inputs to and from an accessory and a device.

FIG. 6 illustrates example software architecture 600 for processing inputs to and from an accessory and a device.

Software architecture 600 can include operating system 602, accessory protocol service 604, touch service 605, accessibility framework 606, and other application(s) 608. Architecture 600 can conceptually operate on top of a hardware layer (not shown).

Operating system 602 provides an interface to the hardware layer. Operating system 602 can include one or more software drivers that communicate with the hardware layer. For example, the drivers can receive and process data packets received through the hardware layer from accessory devices. The operating system 602 can process raw input data received from the driver(s). This processed input data can then be made available to accessory protocol service 604 through one or more application programming interfaces (APIs). These APIs can be a set of APIs that are usually included with operating systems such as, for example, Linux or UNIX APIs), as well as APIs specific for sending and receiving data relevant to access communication.

Accessory protocol service 604 receives data (e.g., accessibility packets) from operating system 602, for example, through one or inure APIs. Each accessibility packet specifics an accessibility command and may also specify one or more parameters for the command. Accessory protocol service 604 interprets the data as one or more events. The events can be in a format (e.g., command name with parameters) that is easier to use in an application than the raw data packets received through the operating system. These events are then provided to accessibility framework 606, for example, using one or more APIs. Accessory protocol service 604 can also receive events from accessibility layer 606, convert the events into corresponding data (e.g., accessibility packets), and send this data to operating system 602. Example command types are described below.

Accessory protocol service 604 interprets data as events, and generates data corresponding to events, according to an accessory API. The accessory API specifies a particular structure for data received from and sent to accessories.

The events generated and processed by accessory protocol service 604 can be classified into several command types, each of which can be identified by a specific identifier value specified by the accessory API and included in the data received from and sent to operating system 602.

Accessibility framework 606 receives events from accessory protocol service 604, for example through one or more APIs. Accessibility framework 606 then processes the events as appropriate. Some events can require accessibility framework 606 to make one or more modifications to its settings or to return information about its settings. These events can be handled by accessibility framework 606 without requiring accessibility framework 606 to interact with other application(s) 608. Other events can require accessibility framework 606 to interact with other application(s) 608, for example, to provide needed input to application(s) 608, to cut, copy, or paste content provided by application(s) 608, or to request other information from application(s) 608.

Accessibility framework 606 can also receive touch events from touch service 605, for example, through one or more touch APIs. The touch service receives touch inputs from operating system layer 602 and converts one or more of these touch inputs into touch input events according to an internal touch event model. The touch input events can be in a format that is easier to use in an application than raw touch input signals generated by the touch sensitive device. For example, a touch input event can include a set of coordinates for each location at which a touch is currently occurring on a drafting user interface. Each touch input event can include information on one or more touches occurring simultaneously.

In some implementations, gesture touch input events can also be detected by combining two or more touch input events. The gesture touch input events can contain scale and/or rotation information. The rotation information can include a rotation value that is a relative delta in degrees. The scale information can also include a scaling value that is a relative delta in pixels on the display device. Other gesture events are possible.

Accessibility framework 606 can request information from other application(s) 608 and send information to other application(s) 608 through an accessibility API, for example, in response to accessibility events or touch events. The accessibility API can be made available to developers as a Software Development Kit (SDK) or as part of an application (e.g., as part of a browser tool kit). The accessibility API can specify particular commands and parameters used by the accessibility framework 606 to communicate applications (608), and vice versa, Other application(s) 608 are applications executing on the device. Other applications 608 can interact with accessibility framework 606 according to an accessibility API. Example types of applications include, but are not limited to, word processors, web browsers, spreadsheet applications, media players, and any other software applications. Other types of applications can also interact with the accessibility framework 606 according to the accessibility API. These applications can interact with the accessibility framework 606 without knowing whether the accessibility framework has received touch, or accessory, input.

Example accessibility commands include, for example, accessibility event commands get accessibility parameter commands, return accessibility parameter commands, set accessibility parameter commands, get current item property commands, return current item property commands, and set context commands. Each accessibility command can have command-specific parameters.

Accessibility Event Command

An accessibility event command can correspond to input from a user requesting that accessibility framework 606 take an action of a particular type. The parameters for an accessibility event command can include a parameter identifying the type of action that is requested, as well as any parameters required for that action. Example accessibility event types and example identifier values for the example accessibility event types include the following: a move to event, a move to first event, a move to last event, a move to next event, a move to previous event, a scroll left page event, a scroll right page event, a scroll up page event, a scroll down page event, a scroll to event, an input text event, a cut event, a copy input event, a paste event, a home event, a touch event, a scale display factor event, a center display around point event, a pause speaking event, a resume speaking event, a read all from current event, a read all from top event, and a speak string event. Other event types can optionally be used.

The move to event command can have parameters that specify the x and y coordinates of where a cursor should be moved to on the display of the device. When an event is a move to event, accessibility framework 606 can move a cursor on the screen of the device to the specified location. Optionally, the accessibility layer may also cause a description of the content at the new location to be presented to the user, e.g., through haptic feedback or synthesized speech. In some implementations, the coordinates in the accessibility packet for the move to event command can be relative to a screen of a predetermined size. Accessory protocol service 604 can map the relative coordinates to the actual screen of the device, taking into account a current orientation of the device, before generating an event for accessibility framework 606.

The move to first, move to last, move to next, and move to previous event commands can have no additional parameters. When an event is a move to first event, accessibility framework 606 can move the cursor to the first item displayed on the user interface of the device. Similarly, when the event is a move to last event, accessibility framework 606 can move the cursor to the last item displayed on the user interface; when the event is a move to next event, accessibility framework 606 moves to the next item displayed on the user interface; when the event is a move to next event, accessibility framework 606 moves to the next item displayed on the user interface; and when the event is a move to previous event, accessibility framework 606 moves to the previous item displayed on the user interface. The next and previous items are defined relative to the last item for which information was presented. The first and last items are the first and last items presented on the user interface according to an order of the items defined on the user interface. For example, the items can have a Cartesian order where they are ordered based on their physical location on the screen from top left to bottom right.

The scroll page left event command, scroll page right event command, scroll page up event command and scroll page down event command can each have no additional parameters. When an event is a scroll left page event, accessibility framework 606 can cause the content displayed on the user interface to scroll to the left, e.g., by moving an indicator on a scroll bar associated with the content to the left. In some implementations, accessibility framework 606 can also request new content to display as a result of the scrolling, e.g., from application(s) 608. Accessibility layer 606 can respond similarly to scroll right page events, scroll up page events, and scroll down page events. The scroll to event command can have a parameter that specifics the x and y coordinates of a particular location on one or more scroll bars. When an event is a scroll to event, accessibility framework 606 can scroll the content so that indicators on the scroll bars are at the specified locations. The coordinates received as part of the accessibility packet for the scroll to event command can be relative to content of a predetermined size. Accessory protocol service 604 can map the received coordinates to appropriate coordinates in the content before generating an event for accessibility framework 606.

The input text event command can have an additional parameter that specifies particular text to be entered in an input field provided by an application 608. When an event is an input text event, accessibility framework 606 can provide an event to an appropriate application 608 indicating that the text specified by the additional parameter should be entered into an input held provided by application 608. Appropriate application 608 can be, for example, an application that currently has focus on the device.

The cut event, copy event, and paste event commands can have no additional parameters. When an event is a cut event, accessibility framework 606 can provide an event to on appropriate application 608 indicating that selected content should be cut (e.g., copied and then deleted). Appropriate application 608 can be, for example, an application that currently has focus on the device. Similarly, when the event is a copy event or a paste event, accessibility framework 606 can provide an event corresponding to copy or paste to appropriate application 608. In some implementations, cut, copy, and paste event are processed according to a particular context of the device. The context can be set using the set context command, as described in more detail below.

The home event command can have no additional parameters. When an event is a home event, accessibility framework 606 can provide an event to an appropriate application 608 indicating that the application should return to a pre-designated home screen.

The touch event command can have additional parameters specifying the x and y coordinates of the location of the event, and a description of the type of touch event (e.g., began, moved, stationary, ended, or cancelled). When an event is a touch event, accessory protocol service 604 can generate a touch event (e.g., corresponding to a user touching a user interface in the particular location) and provide this to accessibility framework 606.

The scale display factor event command can have an additional parameter specifying a desired scale of the display on the user interface of the device. When an event is a scale display factor event, accessibility framework 606 can modify the scale of the display to the desired scale included in the accessibility packet for the scale display factor event command, e.g., by instructing a component of the operating system responsible for presenting data on the display to modify the scale of the display.

The center display around point event command can have additional parameters specifying the x and y coordinates of where in the content the display should be centered. The coordinates can be relative to content of a predetermined size. When un event is a center display around point event, accessibility framework 606 can center the display of the device around the x and y coordinates specified in the accessibility packet for the center display around point event command, e.g., by instructing a component of the operating system responsible for presenting data on be display to change the center of the display.

The pause speaking event command, resume speaking event command, read all from current event command, and the read all from top event command can each have no additional parameters. In response to a pause speaking event, accessory application 606 can stop providing auditory feedback (e.g., pause synthesized speech). Similarly, in response to a resume speaking event, accessory application 606 can resume providing auditory feedback. In response to a read all from current event, accessibility framework 606 can read (e.g., using synthesized speech) all content displayed on the device, beginning from the current location. In response to a read all from top event, accessibility framework 606 can read all content displayed on the device beginning from the top of the user interface.

The speak string event command can have an additional parameter specifying text that should be spoken. In response to a speak string event, accessory application 606 can cause the specified text to be spoken, for example, using synthetic speech.

In some implementations, the accessibility event command is also used by the device to report events to the accessory. For example, the device can use all, or a subset, of the events described above to report different events. For example, the input text command can be used to indicate the text of a message or the phone number of an incoming phone call. As another example, the move to command can be used to indicate that the focus of the device has changed to a window at a particular location.

In some implementations, the accessibility event commands having absolute arguments that do not require an accessory to maintain state can be used by the device. These commands can include, for example, the move to command, the scroll to command, the input text command and, the touch event command, and the center display around point command. When an accessory receives the accessibility event command, the accessory can change its configuration or otherwise present information to a user that corresponds to the accessibility event command.

Get, Return, and Set Accessibility Parameter Commands

The get accessibility parameter command can correspond to a request from the accessory for a value for particular accessibility parameter. The return accessibility parameter command can be a response to the get accessibility parameter command, where the device sends the requested value to the accessory. The set accessibility parameter command can correspond to a request from the accessory to modify the value for a particular accessibility parameter. Each command has a corresponding parameter specifying the particular accessibility parameter of interest. Example accessibility parameters include, for example, the volume of synthesized speech and the speaking rate of synthesized speech. The return and set accessibility parameter commands can also include a parameter corresponding to a value for the particular accessibility parameter.

When accessibility framework 606 receives an event correspond ng to a get accessibility parameter command, accessibility framework 606 identifies the desired parameters and returns the value of the parameter to accessory protocol service 604. Accessory protocol service 604 then generates and sends a return accessibility parameter data packet corresponding to the event to the requesting accessory. When accessibility framework 606 receives an event corresponding to a set accessibility parameter command, accessibility framework 606 modifies the value of the parameter to be the specified value.

Get and Return Current Item Property Commands

The get current item property command can correspond to a request from the accessory for a value for particular property of an item currently selected on the user interface of the device. The return current item property command can be a response to the get current item property command, where the device sends the value of the requested property to the accessory. Each command has a corresponding parameter specifying the particular property of interest. Example properties include, for example, a label of the current item, a value of the current item, a hint for the current item, a frame of the current item, and traits of the current item. The return current item property command can also include a parameter corresponding to a value for the particular property.

When accessibility framework 606 receives an event corresponding to a get current item property command, accessibility framework 606 retrieves the desired current item property and returns the value of the current item property to accessory protocol service 604. Accessory protocol service 604 then generates and sends a return current item property accessibility packet to the requested accessory. In some implementations, the value of a particular property is specific to the size, resolution, and/or orientation of the device. For example, the value for the frame property can be the specific coordinates of a rectangle that encloses a selected item on the user interface. Accessory protocol service 604 can map these coordinates to a display screen of a predetermined size before generating the return current item property accessibility packet.

Set Context Command

The set context command can correspond to a request change the context of commands received from the accessory. The set context command can have a parameter specifying the desired context. For example, the set context command can specify that navigational commands received from the accessory should be processed in a particular context. Example contexts related to navigation include header, indicating that the commands from the accessory should be interpreted as instructions to navigate between headers of a document, link, indicating that the commands from the accessory should be interpreted as instructions to navigate between the links of a document, and form, indicating that the commands from the accessory should be interpreted as instructions to navigate between forms. As another example, the set context command can specify a desired context for manipulating text. For example, the context can be a cursor context, indicating that commands, e.g., edit, copy, cut, or paste commands received from the accessory, should be interpreted relative to a cursor location.

When accessibility framework 606 receives an event corresponding to a set context command, accessibility framework 606 modifies stored context data to indicate the context specified by the set context command.

Example Device Architecture

Figure 7:
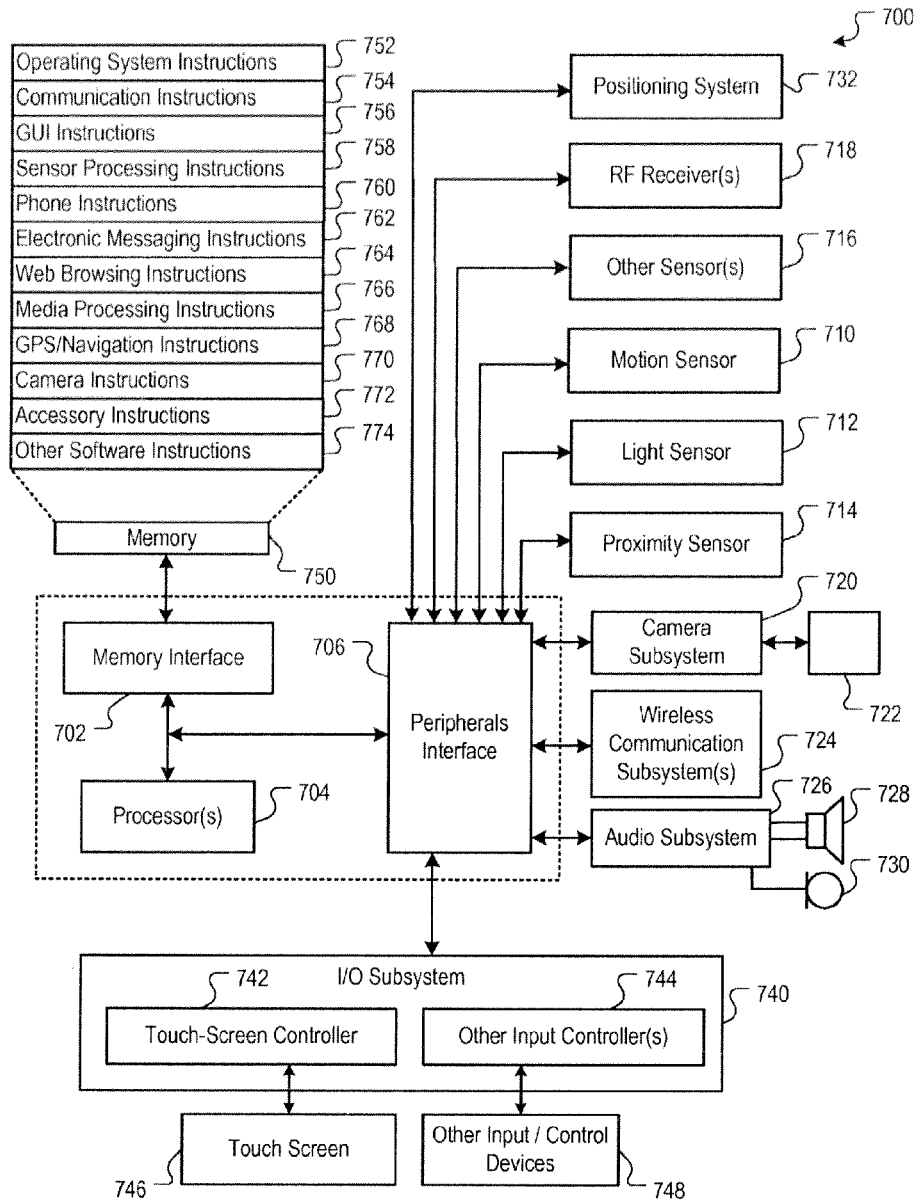
FIG. 7 is a block diagram of example hardware architecture of a device operable to interact with an accessory.

FIG. 7 is a block diagram of example hardware architecture of device 700 operable to interact with an accessory. Device 700 can include memory interface 702, one or more data processors, image processors and/or central processing units 704, and peripherals interface 706. Memory interface 702, one or more processors 704 and/or peripherals interface 706 can be separate components or can be integrated in one or more integrated circuits. The various components in device 700 can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate various orientation, lighting, and proximity functions. Example motion sensors include accelerometers, gyroscopes, and velicometers. In some implementations, proximity sensor 714 can detect the user positioning device 700 proximate to the user's ear and, in response, device 700 can disengage the touch-sensitive display to prevent accidental function invocations. In some implementations, the touch-sensitive display can be turned off to conserve additional power when device 700 is proximate to the user's ear.

For example, in some implementations, light sensor 712 can be utilized to facilitate adjusting the brightness of touch screen 746. In some implementations, motion sensor 711 can be utilized to detect movement of the device. Accordingly, display objects and/or media can be presented according to a detected orientation, e.g., portrait or landscape.

Other sensors 716 can also be connected to peripherals interface 706, such as a temperature sensor, a biometric sensor, or other sensing device, to facilitate related functionalities.

Location determination functionality can be facilitated through positioning system 732. Positioning system 732, in various implementations, can be a component internal to device 700, or can be an external component coupled to device 700 (e.g., using a wired connection or a wireless connection). In some implementations, positioning system 732 can include a GPS receiver and a positioning engine operable to derive positioning information from received GPS satellite signals. In other implementations, positioning system 732 can include a compass e.g., a magnetic pass and an accelerometer, as well as a positioning engine operable to derive positioning information based on dead reckoning techniques. In still further implementations, positioning system 732 can use wireless signals (e.g., cellular signals, IEEE 802.11 signals) to determine location information associated with the device Hybrid positioning systems using a combination of satellite and television signals, such as those provided by ROSUM CORPORATION Mountain View, Calif., can also be used. Other positioning systems are possible.

Broadcast reception functions can be facilitated through one or more radio frequency (RF) receiver(s) 718. An RF receiver can receive, for example, AM/FM broadcasts or satellite broadcasts (e.g., XM® or Sirius® radio broadcast). An RF receiver can also be a TV tuner. In some implementations, RF receiver 718 is built into wireless communication subsystems 724. In other implementations, RF receiver 718 is an independent subsystem coupled to device 700 (e.g., using a wired connection or a wireless connection). RF receiver 718 can receive simulcasts. In some implementations. RF receiver 718 can include a Radio Data System (RDS) processor, which can process broadcast content and simulcast data (e.g., RDS data). In some implementations, RF receiver 718 can be digitally tuned to receive broadcasts at various frequencies. In addition, RF receiver 718 can include a scanning function which tunes up or down and pauses at a next frequency where broadcast content is available.

Camera subsystem 720 and optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 724. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a ed connection to other computing devices, such as other un cation devices, network access devices, a personal computer, a printer, a display screen, or other processing devices capable of receiving and/or transmitting data. The specific design and implementation of communication subsystem 724 can depend on the communication network(s) or medium(s) over which device 700 is intended to operate. For example, device 700 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA)

networks, and a Bluetooth™ network. Communication subsystems 724 may include hosting protocols such that Device 700 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 726 can be coupled to speaker 728 and one or more microphones 730. One (more microphones 730 can be used, for example, to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to touch screen 746. Touch screen 746 and touch screen controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 746 or proximity to touch screen 746.

Other input controller(s) 744 can be coupled to other input/control devices 748, such as one or more buttons, rocker switches, thumb-wheel, infrared port, USB port, a pointer device such as a stylus, and/or other accessories. The one or more buttons (not shown) can include an up/down button for volume control of speaker 728 and/or microphone 730.

In one implementation, a pressing of the button for a first duration may disengage a lock of touch screen 746; and a pressing of the button for a second duration that is longer than the first duration may turn power to device 700 on or off. The user may be able to customize a functionality of one or more of the buttons. Touch screen 746 can, for example, also be used to implement virtual or soft buttons and/or a keyboard.

In some implementations, device 700 can present recorded audio and/or video files, such as MP3, AAC, and MPEG files. In some implementations, device 700 can include the functionality of an MP3 player, such as an iPhone™.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can be a kernel (e.g., UNIX kernel).

Memory 750 may also store communication instructions 754 to facilitate communicating with one or more additional devices, one or more computers and/or one or more servers. Communication instructions 754 can also be used to select an operational mode or communication medium for use by the device, based on a geographic location (obtained by GPS/Navigation instructions 768) of the device. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions, e.g., mapping a target location; camera instructions 770 to facilitate camera-related processes and functions; accessory instructions 772 to facilitate processing input and output to and from an accessory, and/or other software instructions 774 to facilitate other processes and functions, e.g., security processes and functions, device customization processes and functions (based on predetermined user preferences), and other software functions. Memory 750 may also store other software instructions (not shown), such as web video instructions to facilitate web video-related processes and functions; and/or web shopping instructions to facilitate web shopping-related processes and functions. In some implementations, media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of device 700 may be implemented in hardware and/or in software, including in one or more signal processing and/or application specific integrated circuits.

Network Operating Environment or a Device

Figure 8:
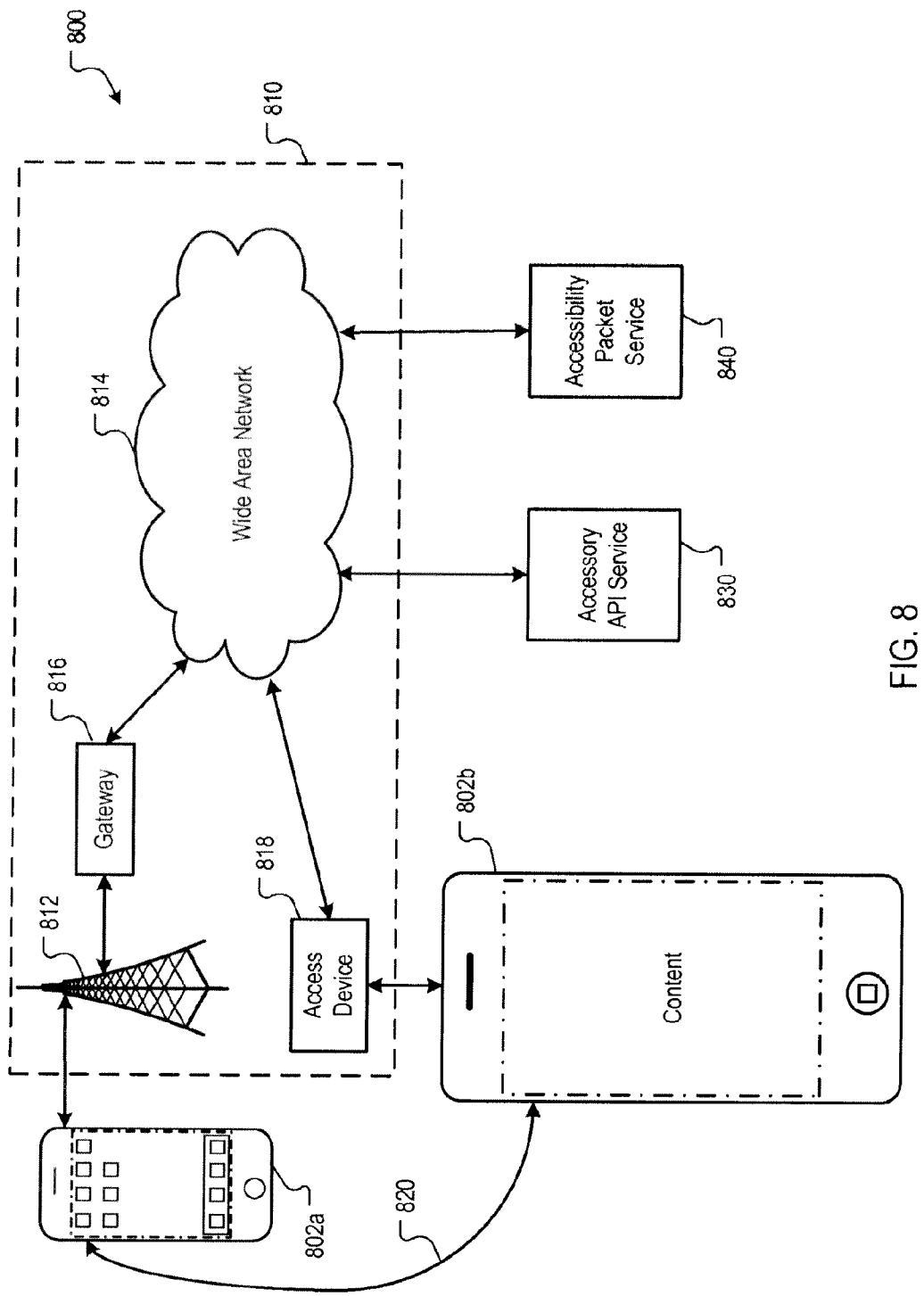
FIG. 8 is a block diagram of an example network operating environment for a device operable to interact with an accessory.

FIG. 8 is a block diagram of example network operating environment 800 for a device operable to interact with an accessory. Devices 802*a* and 802*b* can, for example, communicate over one or more wired and/or wireless networks 810 in data communication. For example, wireless network 812, e.g., a cellular network, can communicate with a wide area network (WAN) 814, such as the Internet, by use of gateway 816. Likewise, access device 818, such as an 802.11g wireless access device, can provide communication access to wide area network 814. In some implementations, both voice and data communications can be established over wireless network 812 and access device 818. For example, device 802*a* can place and receive phone calls (e.g., using VoIP protocols), send and receive e-mail messages (e.g., using POP3 protocol), and retrieve electronic documents and/or streams, such as web pages, photographs, and videos, over wireless network 812, gateway 816, and wide area network 814 (e.g., using TCP/IP or UDP protocols). Likewise, in some implementations, device 802*b* can place and receive phone calls, send and receive e-mail messages, and retrieve electronic documents over access device 818 and wide area network 814. In some implementations, devices 802*a* or 802*b* can be physically connected to access device 818 using one or more cables and access device 818 can be a personal computer. In this configuration, device 802*a* or 802*b* can be referred to as a "tethered" device.

Devices 802*a* and 802*b* can also establish communications by other means. For example, wireless device 802*a* can communicate with other wireless devices, e.g., other devices 802*a* or 802*b*, cell phones, etc., over wireless network 812. Likewise, devices 802*a* and 802*b* can establish peer-to-peer communications 820, e.g., a personal area network, by use of one or more communication subsystems, such as a Bluetooth™ communication device. Other communication protocols and topologies can also be implemented.

Devices 802*a* or 802*b* can, for example, communicate with one or more services over one or more wired and/or wireless networks 810. These services can include, for example, accessory API service 830 that provides an accessory API, and accessibility packet service 840 that processes and generates accessibility packets.

Device 802a or 802b can also access other data and content over one or more wired and/or wireless networks 810. For example, content publishers, such as news sites, RSS feeds, web sites, blogs, social networking sites, developer networks, etc., can be accessed by Device 802a or 802b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information from transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly, or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for, interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes aback-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet, The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A non-transitory computer-readable medium comprising processor-executable instructions that, when executed, perform a method for interacting with an accessibility framework executing on a touch input device, the method comprising:

launching the accessibility framework on the touch input device, wherein the accessibility framework is configured to provide a user with enhanced access to the device, wherein the accessibility framework is configured to receive first touch input from a touch surface of the device and interact with one or more applications executing on the device in response to the first touch input, and wherein the accessibility framework is further configured to receive second input through one or more accessories coupled to the device and interact with one or more applications executing on the device in response to the second input;

detecting an accessory coupled to an interface of the device;

enabling receipt of input from the accessory in response to the detecting;

receiving an accessibility packet from the accessory, the accessibility packet including an accessibility command and a parameter, where the parameter is selected by the accessory from a set of parameters defined by an accessory Application Programming Interface;

processing the accessibility packet to extract the accessibility command and the parameter according to the accessory Application Programming Interface; and generating input for the accessibility framework based on the accessibility command and the parameter.

2. The non-transitory computer-readable medium of claim 1, wherein the first accessibility command is one of an accessibility event command, a get accessibility parameter command, a set accessibility parameter command, a get current item property command, and a set context command.

3. The non-transitory computer-readable medium of claim 2, wherein the accessibility packet includes a byte having a value representing the accessibility command.

4. The non-transitory computer-readable medium of claim 1, wherein the accessibility and is an accessibility event command, the first parameter identifies a type of event, and the type of event is one of:
a move to event, a move to first event, a move to last event, a move to next event, a move to previous event, a scroll left page event, a scroll right page event, a scroll up page event, a scroll down page event, a scroll to event, an input text event, a cut event, a copy event, a paste event, a home event, a touch event, a scale display factor event, a center display around point event, a pause speaking event, a resume speaking event, a read all from current event, a read all from top event, and a speak string event.

5. The non-transitory computer-readable medium of claim 1, wherein the accessibility command is one of a get accessibility parameter command and a set accessibility parameter command, the parameter identifies an accessibility parameter, and the identified accessibility parameter is one of speaking volume and speaking rate.

6. The non-transitory computer-readable medium of claim 1, wherein the accessibility command is a get current item property command, the first parameter identifies a property, and the identified property is one of label, value, hint, frame, and traits.

7. The non-transitory computer-readable medium of claim 1, wherein the accessibility command is a set context command, the parameter identifies a context, and the identified context is one of header, link, form, and cursor.

8. The non-transitory computer-readable medium of claim 1, wherein the method further comprises disabling receipt of touch input from the touch surface in response to the detecting.

9. An mobile touch input device, comprising:
a touch sensitive surface;
an interface configured for coupling to an accessory;
a processor coupled to the touch sensitive surface and the interface, the processor programmed for:
launching an accessibility framework on the device, the accessibility framework comprising an Application Programming Interface (API) that defines a packet format for accessibility packets to be used by an accessory to communicate an accessory input to the device, wherein the accessibility packet identifies an accessibility command and a parameter to the command;
detecting an accessory coupled to the interface;
enabling receipt of an accessibility packet from the accessory;
receiving an accessibility packet from the accessory;
processing the accessibility packet to determine an accessory input; and
generating a device input from the accessory input.

10. The mobile touch input device of claim 9, wherein a first accessibility command is one of an accessibility event command, a get accessibility parameter command, a set accessibility parameter command, a get current item property command, and a set context command.

11. The mobile touch input device of claim 9, wherein the accessibility command is an accessibility event command, a parameter of the command identifies a type of event, and the type of event is one of:
a move to event, a move to first event, a move to last event, a move to next event, a move to previous event, a scroll left page event, a scroll right page event, a scroll up page event, a scroll down page event, a scroll to event, an input text event, a cut event, a copy event, a paste event, a home event, a touch event, a scale display factor event, a center display around point event, a pause speaking event, a resume speaking event, a read all from current event, a read all from top event, and a speak string event.

12. The mobile touch input device of claim 9, wherein the accessibility command is one of a get accessibility parameter command and a set accessibility parameter command, the parameter identities an accessibility parameter, and the identified accessibility parameter is one of speaking volume and speaking rate.

13. The mobile touch input device of claim 9, wherein the accessibility command is a get current item property co and, the first parameter identifies a property, and the identified property is one of label, value, hint, frame, and traits.

14. The mobile touch input device of claim 9, wherein the accessibility command is a set context command, the parameter identifies a context, and the identified context is one of header, link, form, and cursor.

15. The mobile touch input device of claim 9, wherein the processor is further programmed for disabling receipt of touch input from the touch surface in response to the detecting of the accessory coupled to the interface.

16. The mobile touch input device of claim 9, wherein the accessibility framework is further configured to request data from an application executing on the mobile touch input device in response to the generated input.

17. The mobile touch input device of claim 9, wherein the accessibility framework is further configured to send data to an application executing on the mobile touch input device in response to the generated input.

18. A non-transitory computer-readable medium comprising processor-executable instructions that, when executed, perform a method for interacting with an accessibility framework executing on a device, the method comprising:
launching an accessibility framework on the device, wherein the accessibility framework is configured to provide a user with enhanced access to the device, wherein the accessibility framework is further configured to receive first touch input from a surface of the device and interact with one or more applications executing on the device in response to the first touch input, and wherein the accessibility framework is further configured to receive second input through one or more accessories coupled to the device and interact with one or more applications executing on the device in response to the second input;

detecting an accessory coupled to an interface of the device;

enabling sending of output from the accessibility framework to the accessory in response to the detecting;

receiving output from the accessibility framework, the output including an accessibility command and a first parameter;

generating an accessibility packet in response to the output, the accessibility packet identifying the accessibility command and the first parameter according to identifiers defined by an application programming interface; and sending the accessibility packet to the accessory.

19. The non-transitory computer-readable medium of claim 18, wherein the accessibility command is one of a return accessibility parameter command or a return current item property command.

20. The non transitory computer-readable medium of claim 18, wherein the accessibility command is a return accessibility parameter command, the first parameter identifies an accessibility parameter, the identified accessibility parameter is one of speaking volume and speaking rate and the output further includes a second parameter specifying a value for the accessibility parameter.

21. The non-transitory computer-readable medium of claim 18, wherein the accessibility on and is a return current item property command, the first parameter identities a property, the identified property is one of label, value, hint, frame, and traits, and the output further includes a second parameter specifying a value for the property.

22. The non-transitory computer-readable medium of claim 18, wherein the device is a touch input device.

23. A non-transitory computer-readable medium comprising processor-executable instructions that, when executed, perform a method implemented by a mobile touch input device, the method comprising:

receiving first input from an accessory communicatively coupled to the mobile touch input device, the first input including a first command identifier corresponding to a get accessibility parameter command and a first parameter identifying the requested accessibility parameter;

providing second input to an accessibility framework executing on the device through an application programming interface, the input requesting a value of an accessibility parameter corresponding to the first parameter, wherein the accessibility framework is configured to provide a user with enhanced access to the device;

receiving a return accessibility parameter command from the accessibility framework in response to the second input, the return accessibility parameter command including the first parameter and a second parameter corresponding to a value of the requested accessibility parameter; and generating an accessibility packet including a second command identifier corresponding to the return accessibility parameter command, the first parameter, and the second parameter, and sending the accessibility packet to the accessory.

* * * * *